United States Patent
Terris et al.

(10) Patent No.: US 7,068,453 B2
(45) Date of Patent: Jun. 27, 2006

(54) THERMALLY-ASSISTED PERPENDICULAR MAGNETIC RECORDING SYSTEM AND HEAD

(75) Inventors: Bruce David Terris, Sunnyvale, CA (US); Jan-Ulrich Thiele, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 203 days.

(21) Appl. No.: 10/789,907

(22) Filed: Feb. 27, 2004

(65) Prior Publication Data

US 2005/0190479 A1    Sep. 1, 2005

(51) Int. Cl.
*G11B 5/02* (2006.01)
(52) U.S. Cl. .................................. 360/59; 360/126
(58) Field of Classification Search ................. 360/59, 360/126
See application file for complete search history.

(56) References Cited

U.S. PATENT DOCUMENTS

| 5,583,727 | A |  | 12/1996 | Parkin |  |
|---|---|---|---|---|---|
| 5,673,163 | A | * | 9/1997 | Cohen | 360/126 |
| 5,986,978 | A |  | 11/1999 | Rottmayer et al. |  |
| 6,493,183 | B1 |  | 12/2002 | Kasiraj et al. |  |
| 6,842,313 | B1 | * | 1/2005 | Mallary | 360/319 |
| 6,906,898 | B1 | * | 6/2005 | Kawato | 360/314 |
| 2004/0075944 | A1 | * | 4/2004 | Macken et al. | 360/126 |
| 2004/0223257 | A1 | * | 11/2004 | Santini | 360/125 |
| 2004/0240108 | A1 | * | 12/2004 | Shukh | 360/125 |
| 2005/0018348 | A1 | * | 1/2005 | Lille et al. | 360/128 |
| 2005/0024771 | A1 | * | 2/2005 | Le | 360/126 |
| 2005/0094315 | A1 | * | 5/2005 | Payne et al. | 360/125 |
| 2005/0122612 | A1 | * | 6/2005 | Albrecht et al. | 360/59 |

OTHER PUBLICATIONS

"Data Recording at Ultra High Density", IBM Technical Disclosure Bulletin, vol. 39, No. 7, Jul. 1996, p. 237.
"Thermally-Assisted Magnetic Recording", IBM Technical Disclosure Bulletin, vol. 40, No. 10, Oct. 1997, p. 65.
Kanai et al., "Numerical analysis of narrow-track single-pole-type head with side shields for 1 Tb/in2 recording", J. Appl. Phys., vol. 93, No. 10, Parts 2 & 3, May 15, 2003, pp. 7738-7740.

* cited by examiner

*Primary Examiner*—David Hudspeth
*Assistant Examiner*—Varsha A. Kapadia
(74) *Attorney, Agent, or Firm*—Thomas R. Berthold

(57) ABSTRACT

A thermally-assisted perpendicular magnetic recording head includes a write pole tip for generating a magnetic write field in the perpendicular magnetic recording layer, a magnetic shield that confines the write field essentially to the data track to be recorded, an electrically resistive heater for heating the recording layer in the presence of the write field, and a return pole. The write pole tip width essentially defines data track width and is substantially surrounded by the magnetic shield. The shield may include side shields with ends located on opposite sides of the write pole tip and a trailing shield having an end spaced from the write pole tip. The resistive heater is wider than the data track and heats both the data track and adjacent tracks, but thermally-assisted magnetic recording occurs only in the data track because the confined magnetic field in the adjacent tracks is less than the required write field.

18 Claims, 2 Drawing Sheets

THERMALLY-ASSISTED PERPENDICULAR MAGNETIC RECORDING SYSTEM AND HEAD

TECHNICAL FIELD

This invention relates generally to a thermally-assisted magnetic recording (TAMR) system, in which data are written while the magnetic recording layer is at an elevated temperature, and more specifically to a TAMR system for perpendicular recording and a TAMR head with an electrically resistive heater.

BACKGROUND OF THE INVENTION

Magnetic recording hard disk drives use a thin-film inductive write head supported on the end of a rotary actuator arm to record data in the recording layer of a rotating disk. The write head is patterned on the trailing surface of a head carrier, such as a slider with an air-bearing surface (ABS) that allows the slider to ride on a thin film of air above the surface of the rotating disk. The write head is an inductive head with a thin film electrical coil located between the poles of a magnetic yoke. When write current is applied to the coil, the pole tips provide a localized magnetic field across a gap that magnetizes regions of the recording layer on the disk so that the magnetic moments of the magnetized regions are oriented into one of two distinct directions. The transitions between the magnetized regions represent the two magnetic states or binary data bits. Commercially-available disk drives use horizontal or longitudinal recording wherein the magnetic moments of the magnetized regions are oriented "longitudinally" in the plane of the recording layer.

The magnetic material (or media) for the recording layer on the disk is chosen to have sufficient coercivity such that the magnetized data bits are written precisely and retain their magnetization state until written over by new data bits. The data bits are written in a sequence of magnetization states to store binary information in the drive and the recorded information is read back with a use of a read head that senses the stray magnetic fields generated from the recorded data bits. Magnetoresistive (MR) read heads include those based on anisotropic magnetoresistance (AMR), giant magnetoresistance (GMR) such as the spin-valve type of GMR head, and more recently magnetic tunneling, such as the magnetic tunnel junction (MTJ) head. Both the write and read heads are kept in close proximity to the disk surface by the slider's ABS, which is designed so that the slider "flies" over the disk surface as the disk rotates beneath the slider. In more recently proposed disk drives the write head or a pad supporting the write head may be in physical contact with the disk so that there is no air-bearing in the region of the write head.

The areal data density (the number of bits that can be recorded on a unit surface area of the disk) is now approaching the point where magnetic grains that make up the data bits are so small that they can be demagnetized simply from thermal instability or agitation within the magnetized bit (the so-called "superparamagnetic" effect). To avoid thermal instabilities of the stored magnetization, a minimal stability ratio of stored magnetic energy per grain, $K_UV$, to thermal energy, $k_BT$, of $K_UV/k_BT >> 60$ will be required, where $K_U$ and V are the magneto-crystalline anisotropy and the magnetic switching volume, respectively, and $k_B$ and T are the Boltzmann constant and absolute temperature, respectively. Because a minimum number of grains of magnetic material per bit are required to prevent unacceptable media noise, the switching volume V will have to decrease, and accordingly $K_U$ will have to increase to further shrink bit sizes. However, increasing $K_U$ also increases the switching field, $H_0$, which is proportional to the ratio $K_U/M_S$, where $M_S$ is the saturation magnetization (the magnetic moment per unit volume). (The switching field $H_0$ is the field required to reverse the magnetization direction, which for most magnetic materials is very close to but slightly greater than the coercivity or coercive field $H_C$ of the material.) Obviously, $H_0$ cannot exceed the write field capability of the recording head, which currently is limited to about 9 kOe for longitudinal recording, and perhaps 15 kOe for perpendicular recording.

Since it is known that the coercivity of the magnetic material of the recording layer is temperature dependent, one proposed solution to the thermal stability problem is thermally-assisted magnetic recording (TAMR), wherein the magnetic material is heated locally to near or above its Curie temperature during writing to lower the coercivity enough for writing to occur, but where the coercivity/anisotropy is high enough for thermal stability of the recorded bits at the ambient temperature of the disk drive (i.e., the normal operating or "room" temperature). Several TAMR approaches have been proposed, primarily for longitudinal recording.

A "wide-area" heater has been proposed to heat a region of the disk wider than the data track to be recorded. A wide-area heater is relatively easy to implement in a conventional recording head structure and has the additional advantage that it heats the data track very efficiently and thus minimizes the required heater temperature for a given required media temperature. TAMR systems with wide-area heaters include systems that use a laser or ultraviolet lamp to do the heating, as described in "Data Recording at Ultra High Density", *IBM Technical Disclosure Bulletin*, Vol. 39, No. 7, July 1996, p. 237; "Thermally-Assisted Magnetic Recording", *IBM Technical Disclosure Bulletin*, Vol. 40, No. 10, October 1997, p. 65; and U.S. Pat. Nos. 5,583,727 and 5,986,978. One problem with a wide-area heater is adjacent-track interference (ATI). Because adjacent tracks are also being heated, the stray magnetic field from the write head can erase data previously recorded in the adjacent tracks. Also, even in the absence of a magnetic field, the thermal decay rate in adjacent tracks is accelerated over that at ambient temperature and thus data loss may occur.

A proposed solution for the ATI problem is a "small-area" heater that heats only the data track. U.S. Pat. No. 6,493,183 describes a TAMR disk drive, also for longitudinal recording, wherein the write head includes an electrically resistive heater located in the write gap between the pole tips for locally heating just the data track. A disadvantage of the small-area resistive heater is that due to the relatively inefficient heat transfer the heater temperatures required to reach a desired media temperature are very high.

While until now only longitudinal magnetic recording has been successfully commercialized, perpendicular magnetic recording has been widely studied and suggested as a promising path toward ultra-high recording densities. In perpendicular recording, the magnetic moments of the magnetized regions are oriented perpendicular to the plane of the recording layer. The most common type of perpendicular magnetic recording system is one that uses a "probe" or single pole type (SPT) write head with a "dual-layer" magnetic recording disk. The dual-layer disk has a perpendicular magnetic recording data layer formed on a magnetically "soft" or relatively low-coercivity magnetically permeable underlayer, the underlayer serving as a flux return path for the write field from the SPT head.

Perpendicular magnetic recording provides the advantage that the magnetically soft, permeable underlayer effectively increases the write field available from the write pole, thus allowing the use of magnetic recording media with a higher coercivity/anisotropy and thus higher stability against magnetization decay. Ultimately, however, perpendicular magnetic recording is also limited by the superparamagnetic effect.

To improve storage technology and specifically the areal bit density beyond the limitations of longitudinal and perpendicular recording, a TAMR system, and in particular a TAMR head, is needed that solves the ATI problem and provides the additional advantages of perpendicular magnetic recording.

SUMMARY OF THE INVENTION

The invention is a thermally-assisted perpendicular magnetic recording head and system. The head includes a write pole for generating a magnetic write field in the perpendicular magnetic recording layer, an electrically resistive heater for heating the recording layer in the presence of the write field, and a return pole. The write pole has a pole tip width that essentially defines the width of the data track to be recorded in the recording layer. The write pole tip is substantially surrounded by a magnetic shield that confines the write field essentially to the data track. The resistive heater is a "wide-area" heater wider than the data track that heats both the data track and adjacent tracks, but thermally-assisted magnetic recording occurs only in the data track because the magnetic field in the adjacent tracks is less than the required write field due to the magnetic field confinement provided by the magnetic shield.

The thermally-assisted perpendicular magnetic recording system may be a disk drive with a recording disk having a magnetically permeable underlayer and a perpendicular magnetic layer on the underlayer. Magnetic flux from the write pole passes through the flux return path provided by the disk underlayer and back through the return pole.

The magnetic shield may include side shields with ends located on opposite sides of the write pole tip and a trailing shield having an end spaced from the write pole tip. The side and trailing shields may be separate or connected. The shield may also be connected to the return pole to provide a magnetic flux return path.

For a fuller understanding of the nature and advantages of the present invention, reference should be made to the following detailed description taken together with the accompanying figures.

DETAILED DESCRIPTION OF THE INVENTION

Figure 1:
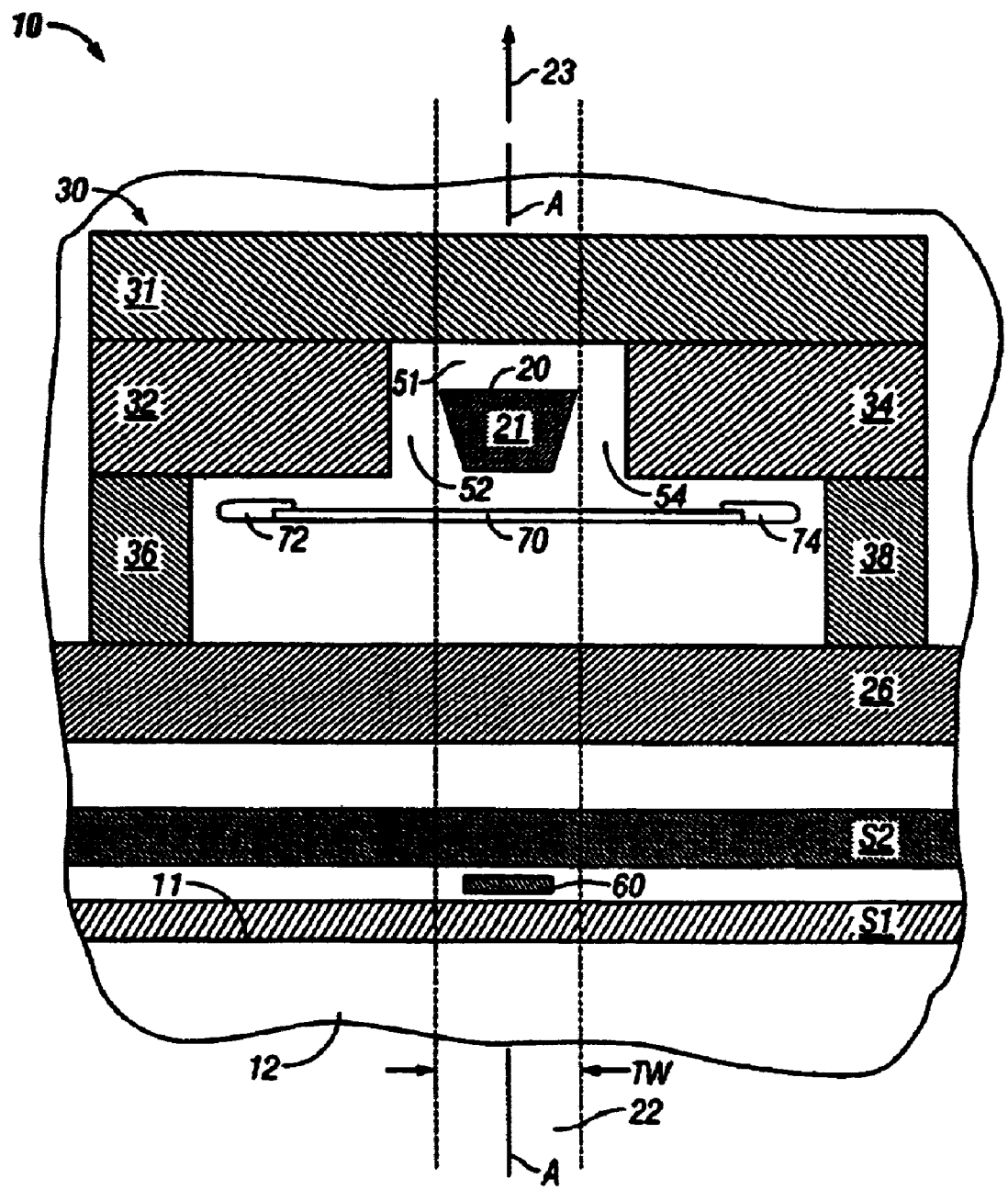
FIG. 1 is a view, as seen from the recording medium, of a TAMR head according to the present invention showing the write pole, the shields and the resistive heater.

FIG. 1 is an illustration of the recording head 10 of the present invention as seen from the recording medium. The head 10 includes a series of thin films and structures formed on the trailing surface 11 of a head carrier. The head carrier has a recording-layer-facing surface 12 oriented generally perpendicular to trailing surface 11. In a disk drive embodiment the head carrier is an air-bearing slider, surface 11 is the end of the slider on which the thin films are formed, and surface 12 is the ABS of the slider. The ABS 12 is the recording-layer-facing surface of the slider that faces the disk and is shown without the thin protective overcoat typically present in an actual slider. The recording-layer-facing surface shall mean the surface of the head carrier that is covered with a thin protective overcoat, the actual outer surface of the head carrier if there is no overcoat, or the outer surface of the overcoat. The phrase "substantially at the recording-layer-facing surface" shall mean actually at the surface or slightly recessed from the surface.

Figure 2:
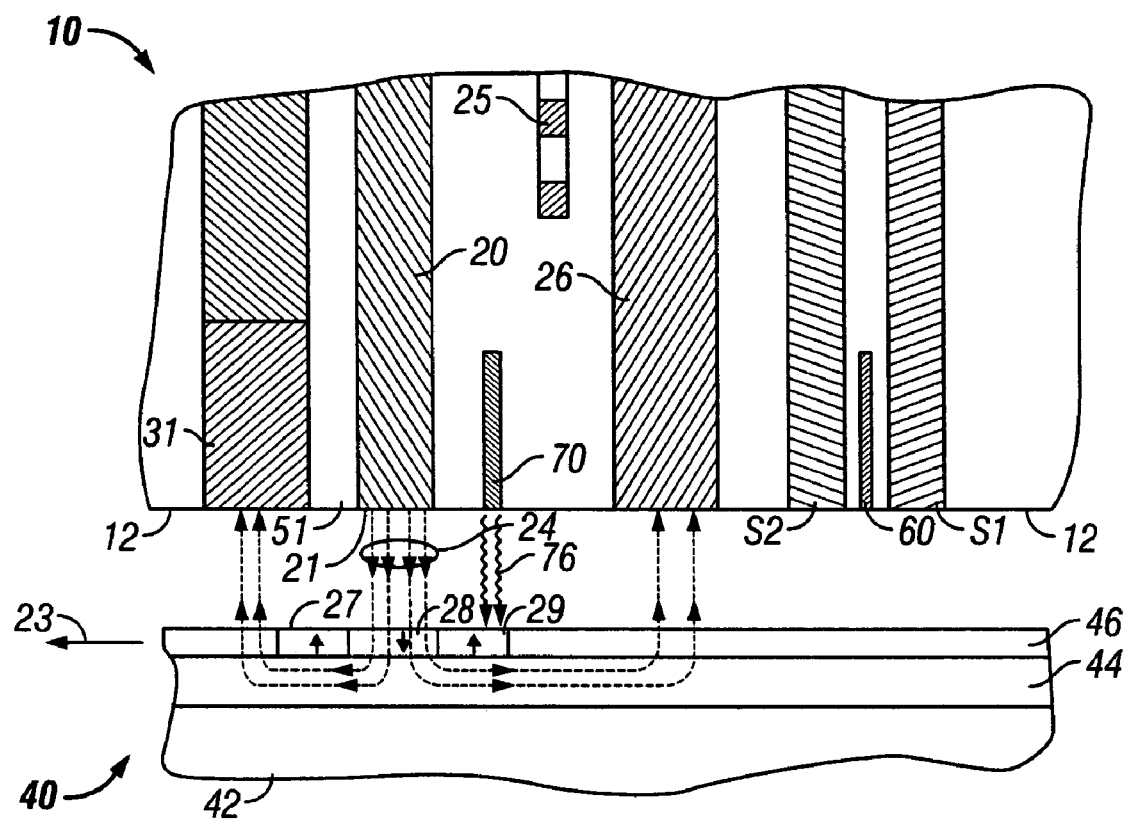
FIG. 2 is a sectional view of the head in FIG. 1 thorough plane AA depicting the TAMR head in operative relationship with a magnetic recording medium.

FIG. 2 is a sectional view through plane AA in FIG. 1 and also shows a section of the recording medium, i.e., disk 40. Disk 40 includes a substrate 42, an underlayer 44, and a perpendicular magnetic recording layer 46. The underlayer 44 may be any alloy material suitable as the magnetically-permeable flux-return path, such as NiFe, FeAlSi, FeTaN, FeN, CoFeB and CoZrNb. The recording layer 46 may be any media with perpendicular magnetic anisotropy, such as a cobalt-chromium (CoCr) alloy granular layer grown on a special growth-enhancing sublayer, or a multilayer of alternating films of Co with films of platinum (Pt) or palladium (Pd).

These figures and the others described below are not to scale because of the difficulty in showing the very small features. The unshaded regions in FIGS. 1 and 2 represent insulating material, typically alumina.

The recording head 10 includes a magnetoresistive read head 60 and a perpendicular write head with a main or write pole 20. The write pole 20 has a pole tip 21. The width of write pole tip 21 substantially defines the track-width TW of the data tracks in the recording layer 46. The dashed lines in FIG. 1 represent the sides of a data track 22. The write pole 20 directs magnetic flux 24 perpendicularly (i.e., "out of the paper" in FIG. 1) to the recording layer 46, to record or "write" magnetic regions in the data tracks. The transitions between recorded regions (such as regions 27, 28 and 29 in FIG. 2) represent data bits that are read by the read head 60. The magnetoresistive read head 60 and its shields S1 and S2 can be located on either side of the write head, i.e., the read head and its shields can be fabricated on the trailing surface 11 before or after the write head. The surface 11 is called the trailing surface because of the direction 23 of the recording medium relative to head 10. Surface 11 is located at the end of the head carrier and thus as the recording medium moves relative to the head 10, the data bits first pass read head 60 and then write pole tip 21. The direction 23 is thus called the down-track direction and the direction perpendicular to the down-track direction (and parallel to the track-width TW) is called the cross-track direction.

The write head also includes a flux return pole 26 with an end substantially at the recording-layer surface, an electrical coil 25 (FIG. 2) between the write pole 20 and return pole 26, and a ferromagnetic shield structure 30.

The shield structure 30 is described in detail as a shield for a conventional SPT perpendicular recording head in co-pending application Ser. No. 10/676,742 filed Sep. 30, 2003 and assigned to the same assignee as this application. Shield 30 is formed of soft ferromagnetic material, such as permalloy (NiFe), CoFe or NiFeCo, and includes a trailing shield 31 down-track from write pole tip 21 and side shields 32, 34 cross-track from write pole tip 21. The shields 31, 32, 34 all have ends substantially at the recording-layer-facing surface. Side shields 32, 34 are connected to return pole 26 by studs, 36, 38, respectively, also formed of soft ferromagnetic material. The shield 30 is adjacent to three sides of the write pole tip 21 and in this manner substantially surrounds the write pole tip 21. Trailing shield 31 is separated from write pole tip 21 by an insulating gap 51, and side shields 32, 34 are separated from write pole tip 21 by insulating gaps 52, 54, respectively.

The head 10 also includes an electrically-resistive heater 70 formed of relatively high electrical resistivity material, such as graphite-like carbon, aluminum (Al), chromium (Cr), nichrome (NiCr), tantalum (Ta), or titanium (Ti). A chemically-disordered CrV alloy has also been proposed as an electrically resistive heater, as described in pending application Ser. No. 10/426,748 assigned to the same assignee as this application. The heater 70 is connected to heater control circuitry by leads 72, 74, typically formed of high electrical conductivity material, such as copper (Cu), gold (Au) or rhodium (Rh). The heater 70 has an edge substantially at the recording-layer-facing surface, i.e., it may be located directly at the edge or slightly recessed for corrosion protection and to avoid large electrical potentials at the surface. The width of the edge of heater 70 is wider than the track-width TW so it is called a "wide-area" heater.

Figure 3:
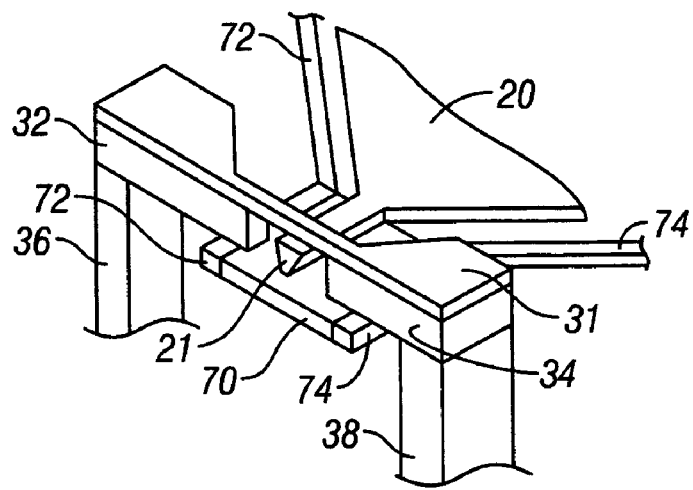
FIG. 3 is a perspective view of a portion of the head depicted in FIGS. 1 and 2 and better illustrating the structural relationship among the write pole, the shields and the resistive heater.

FIG. 3 is a perspective view a portion of the head 10 showing the relationship between the shield 30, write pole 20 with pole tip 21, and resistive heater 70.

The operation of the head will now be explained. As portions of the recording layer 46 in track 22 pass in the direction 23, the heater 70 heats an area of the recording layer wider than track 22, as represented by heat flux lines 76 (FIG. 1). This raises the temperature of the recording layer 46 to thereby lower the coercivity of the ferromagnetic material in recording layer 46. A magnetic write field is generated by write current through coil 25 and is directed perpendicularly to recording layer 46 by write pole tip 21, as shown by magnetic flux lines 24 (FIG. 1). The magnetization will be changed in all portions of the recording layer 46 where the write field is greater than the switching field $H_0$ of the recording layer. However, because of the shield 30, the write field will be greater than $H_0$ of the recording layer only in the regions within track 22. The shield 30 directs flux away from adjacent tracks and substantially confines the write field to the track to be written. Thus, even though the wide-area heater 70 has heated adjacent tracks and made them susceptible to being written, the magnetic field to which the adjacent tracks is exposed is insufficient to alter the magnetization in the adjacent tracks. Thus data previously recorded in the adjacent tracks is not erased.

The operation can be better understood with an example of a head-disk combination having certain materials and dimensions. In this example the write pole tip is formed of NiFeCo and has a width of 75 nm for a track pitch of 100 nm, as required, for example, for an areal recording density of 300 Gbit/in2. The write field is 14 kOe at the center of the recording layer. The shields are permalloy and spaced from the write pole tip by 50 nm wide insulating gaps, with the gap material being alumina. The resistive heater is formed of CrV with a thickness of 30 nm, a height of 1 µm and a width of 6 µm. The recording layer is formed of CoPtCr with an easy axis perpendicular to the film plane. The CoPtCr media has a room temperature coercivity of 7.2 kOe for typical magnetometry measurement time scales (10 s) and 10 kOe for typical writing times (1 ns). The spacing between the write head and the recording layer is 10 nm. To write in the track, electrical current of 50 mA is passed through the heater to raise the temperature of the recording layer in a region of about 40 tracks to approximately 80° C., to thereby reduce the switching field to approximately 5.5 kOe in a magnetometry time frame, and 8 kOe at write speed. The shields confine the magnetic flux from the write pole so that the field in the immediately adjacent tracks is approximately 1.5 kOe, which is less than half the field found in the adjacent tracks when using a head without shields. Thus data is written only in the track directly beneath the write head.

The embodiment shown and described has the shield 30 as a single-piece structure surrounding the write pole tip 21. However, the head may include just a trailing shield, just a pair of side shields, or both trailing and side shields substantially surrounding the head but spaced apart from one another and separated by insulating material. Also, the shield 30 has been described as being connected to the return pole 26 by studs 36, 38 so that the flux return path is also through the shields, as shown by the flux lines in FIG. 1. However, the trailing shield and side shields do not need to be connected to the return pole.

The head 10 and disk 40 have been shown in a non-contact relationship, as in a disk drive with an air-bearing slider. However the head, or one or more of the head elements located substantially at the recording-layer-facing surface, can also be fabricated as part of head carrier that is in physical contact with the disk or in a pad that protrudes from the head carrier with only the pad in contact with the disk.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A head for thermally-assisted recording in tracks of a perpendicular magnetic recording layer comprising:
   a head carrier having a recording-layer-facing surface and a trailing surface;
   a write pole on the trailing surface for directing magnetic flux generally perpendicular to the recording layer, the write pole having a pole tip substantially at the recording-layer-facing surface, the write pole tip having a width substantially corresponding to the track width;
   a shield of ferromagnetic material on the trailing surface and having ends substantially at the recording-layer-facing surface and spaced from the write pole tip, the shield substantially surrounding the write pole tip and substantially confining the magnetic flux from the write pole tip to the track width, the shield including side shields located on opposite sides of the write pole tip and a trailing shield; and
   a resistive heater layer of electrically conducting material on the trailing surface for heating the recording layer in the presence of magnetic flux from the write pole, the heater layer having an edge substantially at the recording-layer-facing surface and wider than the write pole tip width; whereby regions of the recording layer wider than the track are heated, but thermally-assisted magnetic recording occurs only in the track.

2. The head of claim 1 wherein the trailing shield is connected to the side shields.

3. The head of claim 1 wherein the write pole tip is located between the heater layer edge and the trailing shield.

4. The head of claim 1 further comprising a return pole on the trailing surface and having an end substantially at the recording-layer-facing surface, the return pole being magnetically coupled to the write pole for providing a return path for magnetic flux from the recording layer.

5. The head of claim 4 wherein the shield is connected to the return pole, whereby magnetic flux from the recording layer is directed from the shield to the return pole.

6. The head of claim 4 wherein the heater layer edge is located between the write pole tip and the return pole end.

7. The head of claim 4 further comprising an electrically conductive coil between the write pole and the return pole for generating magnetic flux in the write pole when electrical current is passed through the coil.

8. The head of claim 1 wherein the head carrier is an air-bearing slider having an air-bearing surface as the recording-layer-facing surface.

9. The head of claim 1 further comprising a magnetoresistive read sensor on the trailing surface.

10. A thermally-assisted perpendicular magnetic recording head for recording data in tracks of a disk having a perpendicular magnetic recording layer, the head comprising:
   an air-bearing slider having an air-bearing surface as the recording-layer-facing surface and a trailing surface;
   a write pole on the trailing surface for directing magnetic flux generally perpendicular to the recording layer, the write pole having a pole tip substantially at the recording-layer-facing surface, the write pole tip having a width substantially corresponding to the track width;
   a shield of ferromagnetic material on the trailing surface and having ends substantially at the recording-layer-facing surface, the shield substantially surrounding the write pole tip and substantially confining the magnetic flux from the write pole tip to the track width, the shield including a trailing shield spaced down-track from the write pole tip and side shields located on opposite sides of the write pole tip and snaced cross-track from the write pole tip;
   a return pole on the trailing surface and having an end substantially at the recording-layer-facing surface, the return pole being magnetically coupled to the write pole for providing a return path for magnetic flux from the recording layer; and
   a resistive heater layer of electrically conducting material on the trailing surface between the write pole tip and the return pole for heating the recording layer in the presence of magnetic flux from the write pole, the heater layer having an edge substantially at the recording-layer-facing surface and wider than the write pole tip width; whereby regions of the recording layer wider than the track are heated, but thermally-assisted magnetic recording occurs only in the track.

11. The head of claim 10 wherein the trailing shield is connected to the side shields.

12. The head of claim 10 wherein the shield is connected to the return pole, whereby magnetic flux from the recording layer is directed from the shield to the return pole.

13. The head of claim 10 further comprising an electrically conductive coil between the write pole and the return pole for generating magnetic flux in the write pole when electrical current is passed through the coil.

14. The head of claim 10 further comprising a magnetoresistive read sensor on the trailing surface.

15. A thermally-assisted perpendicular magnetic recording disk drive comprising:
   a perpendicular magnetic recording disk comprising a substrate, a magnetically-permeable underlayer on the substrate, and a magnetic recording layer on the underlayer, the recording layer storing recorded data in tracks and having perpendicular magnetic anisotropy;
   an air-bearing slider maintained near the surface of the disk and having an air-bearing surface as the recording-layer-facing surface and a trailing surface;
   a write pole on the slider trailing surface for directing magnetic flux generally perpendicular to the recording layer, the write pole having a pole tip substantially at the slider recording-layer-facing surface, the write pole tip having a width substantially defining the width of a data track when the disk is moved relative to the slider;
   a shield of ferromagnetic material on the trailing surface and having ends substantially at the recording-layer-facing surface, the shield substantially surrounding the write pole tip and substantially confining the magnetic flux from the write pole tip to the data track width, the shield including a trailing shield spaced down-track from the write pole tip and side shields located on opposite sides of the write pole tip and spaced cross-track from the write pole tip;
   a return pole on the trailing surface and having an end substantially at the recording-layer-facing surface, the return pole being magnetically coupled to the write pole for providing a return path for magnetic flux from the write pole tip through the recording layer and underlayer,
   an electrically conductive coil between the write pole and the return pole for generating magnetic flux in the write pole when electrical current is passed through the coil;
   a resistive heater layer of electrically conducting material on the trailing surface between the write pole tip and the return pole for heating the recording layer in the presence of magnetic flux from the write pole, the heater layer having an edge substantially at the recording-layer-facing surface and wider than the write pole tip width, whereby regions of the recording layer wider than the data track are heated but thermally-assisted magnetic recording occurs only in the data track; and
   a magnetoresistive read head on the slider trailing surface for reading data recorded in the data tracks.

16. The disk drive of claim 15 wherein the trailing shield is connected to the side shields.

17. The disk drive of claim 15 wherein the shield is connected to the return pole, whereby magnetic flux from the recording layer is directed from the shield to the return pole.

18. The disk drive of claim 15 wherein the magnetoresistive read head is located between the slider trailing surface and the write pole, the direction perpendicular to the trailing surface from read head to the write pole being the down-track direction.

* * * * *

UNITED STATES PATENT AND TRADEMARK OFFICE
CERTIFICATE OF CORRECTION

| | | |
|---|---|---|
| PATENT NO. | : 7,068,453 B2 | |
| APPLICATION NO. | : 10/789907 | |
| DATED | : June 27, 2006 | |
| INVENTOR(S) | : Bruce David Terris and Jan-Ulrich Thiele | |

It is certified that error appears in the above-identified patent and that said Letters Patent is hereby corrected as shown below:

In Claim 10 (column 7, line 42), delete "snaced" and replace with the word "spaced".

Signed and Sealed this

Twenty-ninth Day of August, 2006

JON W. DUDAS
*Director of the United States Patent and Trademark Office*